Feb. 6, 1940.                 C. W. YELM                 2,189,158

OVERFILL PREVENTER FOR STORAGE BATTERIES

Filed Jan. 31, 1939

Inventor:
Charles W. Yelm
By
Martin E. Anderson
Attorney

Patented Feb. 6, 1940

2,189,158

UNITED STATES PATENT OFFICE 2,189,158

OVERFILL PREVENTER FOR STORAGE BATTERIES

Charles W. Yelm, Denver, Colo., assignor to The Gates Rubber Company, Denver, Colo., a corporation of Colorado Application January 31, 1939, Serial No. 253,753

2 Claims. (Cl. 136—178)

This invention relates to means for preventing the overfilling of storage batteries.

In the operation of storage batteries, it is quite essential that the electrolyte be maintained at a predetermined level because if the electrolyte is too high or too low, it interferes with the proper operation of the battery and hastens deterioration.

Storage batteries are usually provided with covers having a central fill opening that is closed by means of a ventilating plug, except when the battery is being tested or filled. When the electrolyte is too low distilled water is introduced into the fill opening and unless extreme care is taken, either too much or too little water is added to the detriment of the battery.

It is the object of this invention to produce a storage battery cover having a fill opening so constructed that it will limit the amount of distilled water that can be added to the electrolyte so as to maintain the electrolyte at a predetermined level after each fill operation.

This invention, briefly described, consists in a cover having a fill opening within a downwardly extending tubular hub or projection provided with an annular flange that extends inwardly from the wall of the fill opening. A sealing ring of distortable resilient material is positioned in the opening and supported on the upper surface of the flange, the opening in the ring being smaller than the opening in the flange so that the ring overhangs the flange. A tubular member is positioned in the opening and projects downwardly below the lower end of the projection. The tube has an annular flange that rests on the upper surface of the ring and is provided with openings that are normally sealed by the encircling wall of the ring. When the tubular member is moved downwardly relative to the flange the ring will be distorted so as to uncover the vents or openings in the tube. When electrolyte or distilled water is introduced through such an opening, air will be trapped in the space surrounding the central hub as soon as the liquid extends over the bottom of the latter and the only additional water that can be added is that which will be contained in the fill opening before the latter overflows. A plug is provided for the closing of the opening and this has means for breaking the seal between the opening and the air chamber above the electrolyte to release the entrapped air, thereby allowing the electrolyte to find its normal level and gases to escape during the charging and the discharging operations.

In order to explain this invention so that it can be readily understood, reference will now be had to the accompanying drawing in which the invention has been illustrated and in which.

Figure 1:
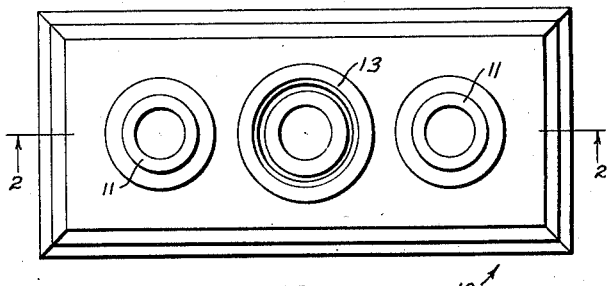
Figure 1 is a top plan view of a battery cover.

In the drawing reference numeral 10 designates the cover of an ordinary storage battery, such as is employed in connection with automobile starting and lighting systems. The cover is provided with terminal openings 11, which are lined with bushings 12 and is also provided with a central fill opening 13. The fill opening is formed in a cylindrical tubular portion that extends partly above and partly below the cover and, the tubular portion may or may not project down below the normal level of the electrolyte, which has been indicated by reference numeral 14 in Figure 2. That portion of the hub or tubular member which projects from the lower surface of the cover has been designated by reference numeral 15 to facilitate identification. It will be observed that the lower end of part 15 is provided with an inwardly extending flange 16, whose upper surface forms a support for a resilient deformable sealing ring 23, which is preferably made from either natural or synthetic rubbers, or of any other suitable resilient material.

Figures 2, 3:
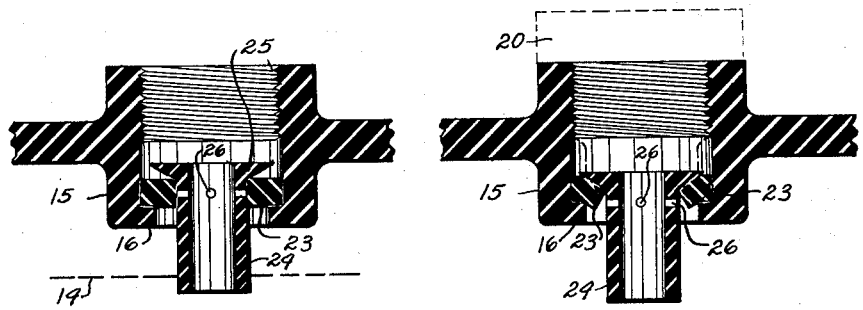
Figure 2 is a diametrical section through the fill opening, taken on line 2—2, Fig. 1, and shows the parts in the position they occupy during the filling of the battery.
Figure 3 is a section similar to that shown in Figure 2, showing the parts in the position they normally occupy during the operation of the batteries.

It will be seen that the sealing ring 23 is supported on the upper surface of flange 16 and that the opening in the ring is smaller than the opening in the flange so that the ring overhangs the flange in the manner shown quite clearly in Figure 2. The opening in the projection 15 and the openings in the ring and in the flange are preferably circular and will be so considered for the purpose of this description. A tube 24 is positioned in the opening in the ring and is provided at its top with an outwardly extending flange 25 that overlaps the upper surface of the ring adjacent the opening therein. In the drawing the under surface of flange 25 has been shown as outwardly and upwardly ranging forming a frustoconical surface, although this is not an essential feature of the construction and the flange 25 may have a flat under surface and be quite narrow, in which case it will function in the same manner.

It will be noticed that the sealing ring is shown of considerable thickness and that the tube is provided with one or more vents 26 positioned below the lower surface of the flange at such a distance as to be substantially in the middle of the ring when the parts are in the position shown in Figure 2. The tube is of such a diameter that when the parts are in position, the tube encircling surface of the ring engages the outer surface of the tube with considerable force so as to form a gastight seal and the outer diameter of the ring is likewise so related to the diameter of the opening in a tubular projection 15 that a gastight seal is formed.

When the plug, which has been indicated by reference numeral 20 in Figure 3 and shown by dotted lines, is screwed into the fill opening, the lower end thereof engages the upper end of tube 24 and forces it downwardly relative to the flange 16. The downward movement of tube 24 deforms the sealing ring 23 in the manner shown in Figure 3 and this separates the wall of the opening in the ring from the outer surface of tube 24, thereby unsealing the vent openings and when the parts are in the position shown in Figure 3, gases can pass through the vents 26 and through the vent openings always provided in plugs 20.

Let us now assume that the battery cover is constructed with a fill opening and seal like that shown in Figures 2 and 3 and that the parts are in the position shown in Figure 3. In order to introduce liquid into the battery, the plug 20 must be removed, whereupon the resiliency of ring 23 moves the parts to the position shown in Figure 2, whereupon the vents 26 are closed against the passage of gases. Liquid can now be poured into the battery and will enter quite freely until the liquid level rises above the lower end of the tube, whereupon air becomes trapped between the upper surface of the liquid and the under surface of the cover. The trapped air or gas will compress slightly and the liquid level will assume a position a short distance above the bottom of the tube, as indicated by line 14. After the liquid reaches the maximum level, no more liquid or electrolyte can be introduced, although nothing is to prevent the operator from filling the opening to the top thereof. When the plug 20 is screwed into position, the parts will be moved downwardly to the position shown in Figure 3, whereupon the seal is broken and the gases generated during charging and discharging can escape as freely as if the ring 23 and tube 24 were not in place.

A battery cover constructed in the manner described can be used without parts 23 and 24 and covers constructed in this manner are therefore suitable for batteries whether or not the overfill preventing device is employed.

Having described the invention what is claimed as new is:

1. A storage battery cover having a downwardly extending tubular projection having a fill opening extending therethrough, the lower end of the projection being below the cover, the wall of the opening having an annular inwardly extending flange, a resilient ring positioned on the upper surface of the flange, the peripherial surface of the ring being in sealing engagement with the wall of the opening, the opening in the flange being substantially larger than the opening in the ring whereby the latter overhangs the flange, a tube positioned in the opening in the ring with its lower end below the lower surface of the flange, the upper end of the tube having an outwardly extending flange overlapping the upper surface of the ring, that portion of the tube which is normally in contact with the encircling wall of the ring being of greater diameter than the opening in the ring whereby a tight fit is formed, the tube wall having a vent opening which is sealed by the ring, the latter being distortable by a force which produces a downward movement of the tube relative to the supporting flange, said distortion moving the tube engaging surface of the ring out of sealing engagement with the vent opening in the tube.

2. A storage battery cover having a downwardly extending tubular projection having a fill opening extending therethrough, the lower end of the projection being below the cover, the wall of the fill opening having an annular inwardly extending flange, a resilient ring positioned on the upper surface of the flange, the outer diameter of the ring being somewhat larger than the diameter of the fill opening, whereby a seal is formed, the opening in the flange being substantially larger than the opening in ring whereby the latter overhangs the inner edge of the flange, a tube positioned in the opening in the ring with its lower end below the lower end of the projection, the upper end of the tube having an outwardly projecting flange whose under surface is upwardly and outwardly flaring, the under surface of the last named flange facing the upper surface of the ring, that portion of the tube which is normally in contact with the wall of the opening in the ring being larger than the opening and provided with a vent opening which is normally sealed by the ring, the latter being distortable by a downward movement of the tube relative to the flange, the distortion serving to move the tube engaging sealing surface of the ring out of contact with the tube to unseal the vent.

CHARLES W. YELM.